(12) United States Patent
Faris

(10) Patent No.: US 6,384,971 B1
(45) Date of Patent: *May 7, 2002

(54) METHODS FOR MANUFACTURING MICROPOLARIZERS

(75) Inventor: Sadeg M. Faris, Pleasantville, NY (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/197,307

(22) Filed: Nov. 19, 1998

Related U.S. Application Data

(63) Continuation of application No. 08/527,094, filed on Sep. 12, 1995, now Pat. No. 5,844,717, which is a continuation of application No. 07/536,419, filed on Jun. 11, 1990, now Pat. No. 5,327,285.

(51) Int. Cl.$^7$ ................................................ G02B 27/28
(52) U.S. Cl. ........................................ 359/483; 359/489
(58) Field of Search .............................. 359/483, 489, 359/246, 252, 254, 259

(56) References Cited

U.S. PATENT DOCUMENTS

| | | |
|---|---|---|
| 1,435,520 A | 11/1922 | Hammond |
| 2,099,694 A | 11/1937 | Land |
| 2,301,254 A | 11/1942 | Carnahan |
| 2,317,875 A | 4/1943 | Athey et al. |
| 2,385,687 A | 9/1945 | Carnanan |

(List continued on next page.)

FOREIGN PATENT DOCUMENTS

| | | | |
|---|---|---|---|
| GB | 489888 | 8/1938 | |
| GB | 1 523 436 | 8/1978 | ............ H04N/9/58 |
| GB | 2 111 798 A | 7/1983 | ............ H04N/9/60 |
| GB | 2 231 754 A | 11/1990 | .......... H04N/13/04 |
| JP | 55-26802 A | 3/1980 | ............ G02F/1/13 |
| JP | S61-142642 | 6/1986 | ............ H01J/31/22 |
| JP | 62-217790 A | 9/1987 | .......... H04N/13/00 |

OTHER PUBLICATIONS

Low Cost Universal Stereoscopic Virtual Reality Interfaces, Professional Product by Michael Starks, 3–D TV Corporation, San Rafael, CA, 1995.

Stereoscopic Real–Time and Multiplexed Video System by Lenny Lipton, SPIE, vol. 1915, 1993, pp. 6–11.

SGS 310 410 610 Stereoscopic 3–D Display Kits by , Tektronix Display Products, Beaverton OR, 1992.

Article in NASA Tech Briefs by, NASA Tech Briefs, 1991, pp. 12–13.

Large Screen Electro–Stereoscopic Displays by Lenny Lipton, SPIE, vol. 1255, 1990, pp. 108–113.

Optics, Ch. 10 by Miles V. Klein, John Wiley & Sons, Inc., 1990.

3–D Flat Panel Color Display PRDA 89–9 Technical/Management and Cost by Phoenix Technology Center, Honeywell Inc., Systems & Research Center Phoenix , 1989.

(List continued on next page.)

*Primary Examiner*—Mark Hellner
(74) *Attorney, Agent, or Firm*—Thomas J. Perkowski; Gerow D. Brill

(57) ABSTRACT

A method of mass producing a micropolarizer including the steps exposing films of predetermined polarization states to electromagnetic radiation through masks of predetermined patterns, etching away exposed parts of each film and aligning and laminating the films to one another to provide a micropolarizer comprising alternating sets of microscopic polarizers with different polarization states.

19 Claims, 12 Drawing Sheets

U.S. PATENT DOCUMENTS

| | | | |
|---|---|---|---|
| 2,417,446 A | 3/1947 | Reynolds | |
| 2,571,612 A | 10/1951 | Rines | |
| 2,623,433 A | 12/1952 | Stipek | |
| 2,631,496 A | 3/1953 | Rehorn | |
| 2,647,440 A | 8/1953 | Rehorn | |
| 2,949,055 A | 8/1960 | Blackstone | |
| 2,983,835 A | 5/1961 | Frey, Jr. | |
| 3,275,745 A | 9/1966 | Var | |
| 3,371,324 A | 2/1968 | Sinoto | |
| 3,507,549 A | 4/1970 | Land | |
| 3,741,626 A | 6/1973 | Wentz | |
| 3,807,831 A | 4/1974 | Soref | |
| 3,821,466 A | 6/1974 | Roese | |
| 3,858,001 A | 12/1974 | Bonne | |
| 3,944,351 A | 3/1976 | Ito et al. | |
| 4,122,484 A | 10/1978 | Tan | |
| 4,281,341 A | 7/1981 | Byatt | |
| 4,286,286 A | 8/1981 | Jurisson et al. | |
| 4,406,521 A * | 9/1983 | Mir et al. | 350/392 |
| 4,431,265 A | 2/1984 | Benton | |
| 4,504,856 A | 3/1985 | Jackman | |
| 4,523,226 A | 6/1985 | Lipton et al. | |
| 4,562,463 A | 12/1985 | Lipton | |
| 4,566,758 A | 1/1986 | Bos | |
| 4,582,396 A | 4/1986 | Bos et al. | |
| 4,583,117 A | 4/1986 | Lipton et al. | |
| 4,588,259 A | 5/1986 | Sheiman | |
| 4,641,178 A | 2/1987 | Street | |
| 4,670,744 A | 6/1987 | Buzak | |
| 4,692,792 A | 9/1987 | Street | |
| 4,707,081 A * | 11/1987 | Mir | 350/388 |
| 4,709,263 A | 11/1987 | Brumage | |
| 4,719,507 A | 1/1988 | Bos | |
| 4,723,159 A | 2/1988 | Imsand | |
| 4,781,440 A | 11/1988 | Toda | |
| 4,792,850 A | 12/1988 | Lipton et al. | |
| 4,872,750 A | 10/1989 | Morishita | |
| 4,873,572 A | 10/1989 | Miyazaki et al. | |
| 4,877,307 A | 10/1989 | Kalmanash | |
| 4,902,111 A * | 2/1990 | Matsubara et al. | 350/393 |
| 4,943,852 A | 7/1990 | Femano et al. | |
| 4,984,179 A | 1/1991 | Walders | |
| 4,995,718 A | 2/1991 | Jachimowicz et al. | |
| 5,007,715 A | 4/1991 | Verhulst | |
| 5,113,285 A | 5/1992 | Franklin et al. | |
| 5,327,285 A * | 7/1994 | Faris | 359/483 |
| 5,402,191 A | 3/1995 | Dean et al. | |
| 5,537,144 A | 7/1996 | Faris | |
| 5,699,133 A | 12/1997 | Furuta | |
| 5,844,717 A * | 12/1998 | Faris | 359/483 |
| 5,886,816 A | 5/1999 | Faris | |

OTHER PUBLICATIONS

Compatibility of Stereoscipic Video Systems with Broadcast Television Standards by Lenny Lipton, SPIE, vol. 1083, 1989, pp. 95–101.

Waves, Berkeley Physics Course—vol. 3 (published circa 1989) by Frank S. Crawford, et. al., unknown, 1989, pp. 394–450.

Field–Sequential Stereoscopic Viewing Systems Using Passive Glasses by Philip Bos and Thomas Haven, Proceedings of the SID, vol. 30, No. 1, 1989, pp. 39–43.

Experience with Stereoscopic Display Devices and Output Algorithms by James S. Lipscomb, SPIE vol. 1083, 1989, pp. 28–34.

3–D Comes Home by Tom Waters, Personal Tech, 1988, pp. 30–32.

High–Performance 3D Viewing Systems Using Passive Glasses by Philip Bos et. al., SID 88 Digest, 1988, pp. 450–453.

A Real–Time Autostereoscopic Multiplanar 3D Display System by Rodney Don Williams and Felix Garcia, et. al., SID 88 Digest, 1988, pp. 91–94.

Three–Dimensional TV with Cordless FLC Spectacles by W.J.A.M. Hartmann and H.M.J. Hikspoors, Information Display, vol. 3, No. 9, 1987, pp. 15–17.

Holographic Display of Three–Dimensional Images by Larry F. Hodges, et. al., Information Display, vol. 3, No. 9, 1987, pp. 8–11.

True Three–Dimensional CRT–Based Displays by Larry F. Hodges and David F. McAllister, Information Display, vol. 3, No. 9, 1987, pp. 18–22.

Hard Copy for True Three–Dimensional Images by Larry F. Hodges, et. al., Information Display, vol. 3, No. 8, 1987, pp. 12–15, 25.

Circular Polarization Image Selection for Timeplex Stereoscopic Video Display by Lenny Lipton, SPIE vol. 779, Display System Optics, vol. 778, 1987, pp. 41–44.

Holographic Micropatterns and the Ordering of Photographic Grains in Film System by James J. Cowan, et. al., ACTA Polytechnica Scandinavica, vol. 1, 1985.

Three–Dimensional Projection with Circular Polarizers by Vivian Walworth, et al., SPIE, vol. 462, 1984, pp. 64–68.

Varifocal Mirror Technique for Video Transmission of Three–Dimensional Images by M.C. King and D.H. Berry, Applied Optics, vol. 9, No. 9, 1970, pp. 2035–2039.

A New Approach to Computer–Generated Holography by M.C. King, et. al., Applied Optics, vol. 9, No. 2, 1970, pp. 471–475.

Principles of Optics, Electromagnetic Theory of Propagation, Interference and Di by Max Born and Emil Wolf, Pergamon Press, 1970, pp. 716–718.

Low–Cost 3–D TV by Edited by Alexander A. McKenzie, Electronics, 1953, pp. 196.

\* cited by examiner

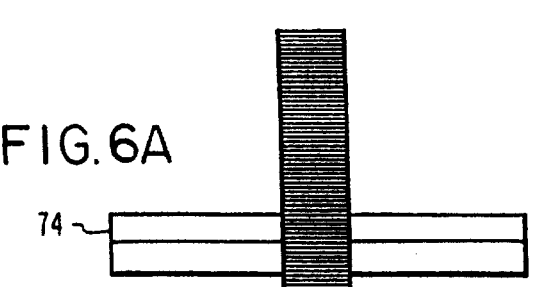
FIG. 6A
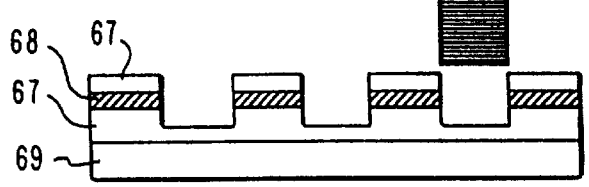
FIG. 6B
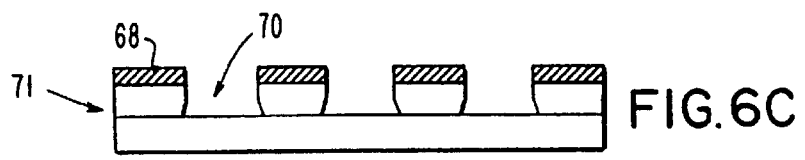
FIG. 6C
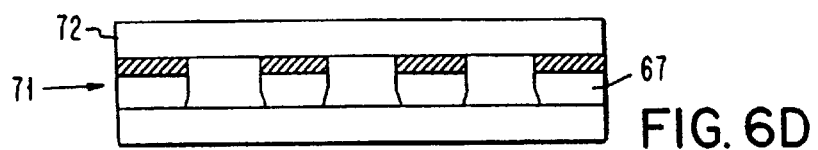
FIG. 6D
FIG. 6E
FIG. 6F
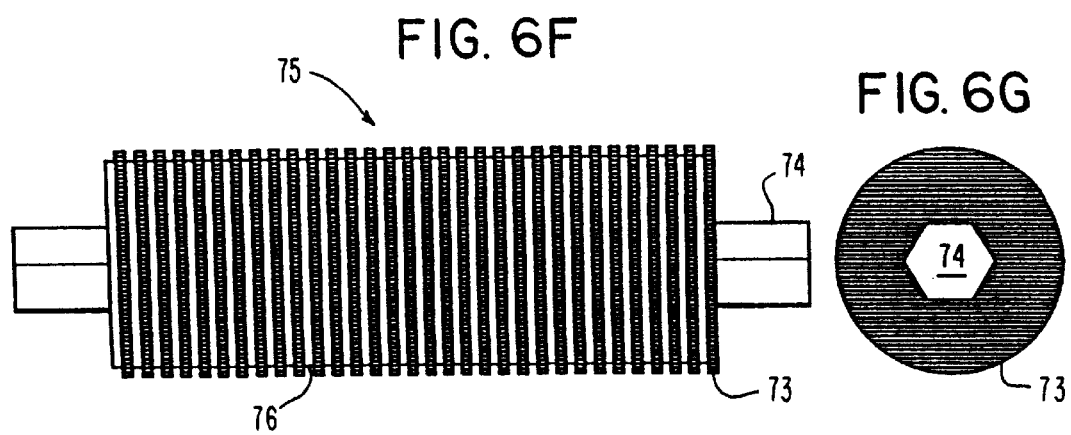
FIG. 6G
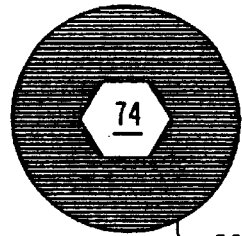

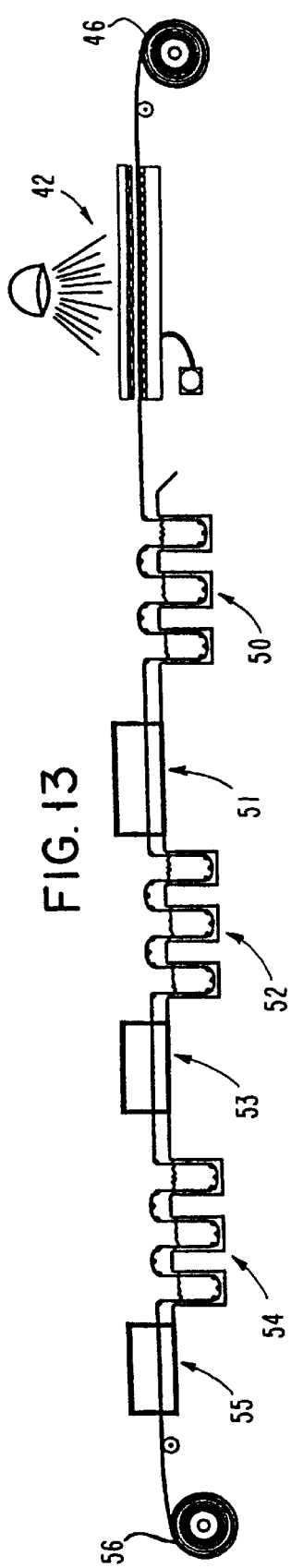
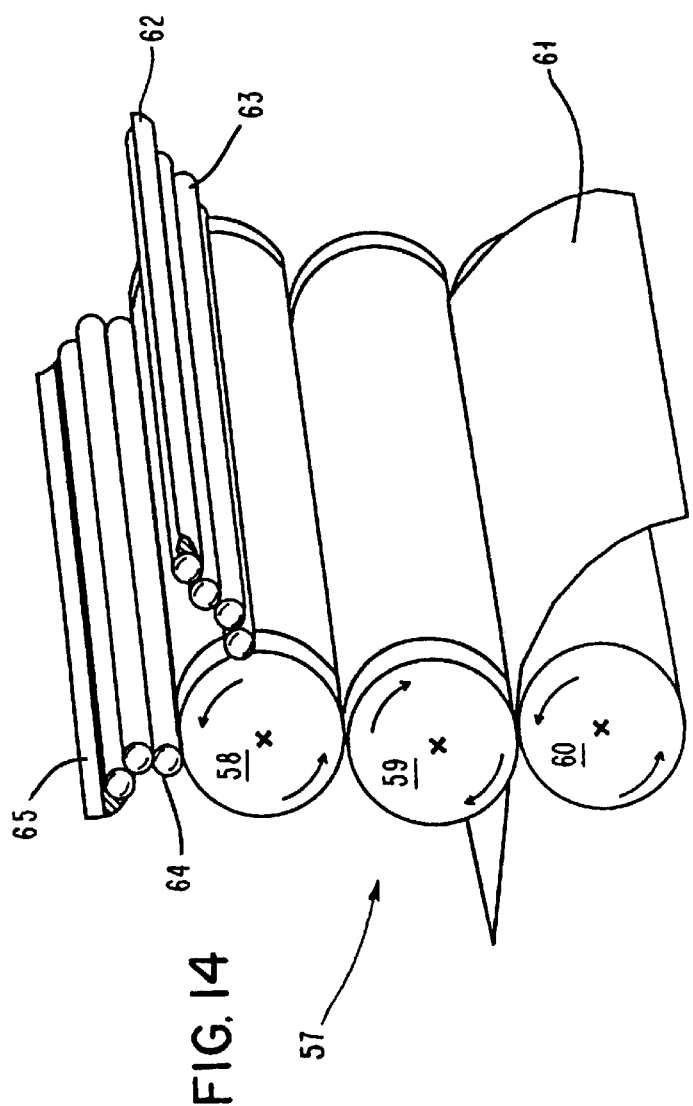
FIG. 13
FIG. 14

METHODS FOR MANUFACTURING MICROPOLARIZERS

RELATED CASES

This is a Continuation application of application Ser. No. 08/527,094, filed Sep. 12, 1995 now U.S. Pat. No. 5,844,717, entitled "Method And System For Producing Micropolarization Panels For Use In Micropolarizing Spatially Multiplexed Images Of 3-D Objects During Stereoscopic Display Processes (As Amended)"; which is a continuation of application Ser. No. 07/536,419, filed Jun. 11, 1990, entitled "METHODS FOR MANUFACTURING POLARIZERS", now U.S. Pat. No. 5,327,285, issued on Jul. 5, 1994.

BACKGROUND OF THE INVENTION

1. Field of the Invention

This invention relates to the field of polarizers and the high throughput mass manufacturing of a new class of polarizars called micropolarizers. Micropolarizers have been developed for use in spatial multiplexing and demultiplexing image elements in a 3-D stereo imaging and display system.

2. Description of Related Art

This invention is related to my co-pending application Ser. No. 07/536,190 entitled "A System For Producing 3-D Stereo Images" filed on even date herewith incorporated herein by reference in its entirety, which introduces a fundamentally new optical element called a micropolarizer. The function of the micropolarizer is to spatially multiplex and spatially demultiplex image elements in the 3-D stereo imaging and displaying system of the aforementioned co-pending application. As shown in FIG. 1, the micropolarizer ($\mu$Pol) 1, 2 is a regular array of cells 3 each of which comprises a set of microscopic polarizers with polarization states P1 and P2. The array has a period p which is the cell size and is also the pixel size of the imaging or displaying devices.

It is possible to turn unpolarized light into linearly polarized light by one of three well known means: 1) Nicol prisms; 2) Brewster Angle (condition of total internal reflection in dielectric materials); and 3) Polaroid film. These are called linear polarizers. The Polaroids are special plastic films which are inexpensive and come in very large sheets. They are made of polyvinyl alcohol (PVA) sheets stretched between 3 to 5 times their original length and treated with iodine/potassium iodide mixture to produce the dichroic effect. This effect is responsible for heavily attenuating (absorbing) the electric field components along the stretching direction while transmitting the perpendicular electric field components. Therefore, if P1 is along the stretching direction of the PVA sheets, it is not transmitted, where as only P2 is transmitted, producing polarized light. By simply rotating the PVA sheet 90 degrees, P1 state will now be transmitted and P2 will be absorbed.

The aforementioned three known means for producing polarized light have always been used in situations where the polarizer elements have large areas, in excess of 1 cm$^2$. However, for 3-D imaging with $\mu$Pols using 35 mm film, to preserve the high resolution, the $\mu$Pol array period p may be as small as 10 micron. Therefore, there is no prior art anticipating the use of or teaching how to mass produce $\mu$Pols having such small dimensions.

SUMMARY OF THE INVENTION

The present invention provides a means for high through put mass manufacturing of micropolarizer arrays. To use the $\mu$Pols in consumer 3-D photography, and printing applications, the economics dictate that the cost of $\mu$Pols be in the range of 1 to 5 cents per square inch. For this reason, the low cost PVA is the basis for the manufacturing process.

The present invention also provides a flexible $\mu$Pols manufacturing process which can be adapted to low and high resolution situations as well as alternative manufacturing methods, each of which may be advantageous in certain applications and adaptable to processing different polarizer materials. The present invention further provides an electronically controllable $\mu$Pol.

BRIEF DESCRIPTION OF THE DRAWINGS

FIG. 6 illustrates a method for patterning micropolarizer by mechanical means.

FIG. 13 illustrates an automated high through-put process for continuous production of micropolarizer sheets by photo-lithographic means.

FIG. 14 illustrates an automated high through-put process for continuous production of micropolarizer sheets by direct application of bleaching ink or iodine-based ink.

DETAILED DESCRIPTION

Figures 1A, 1B:
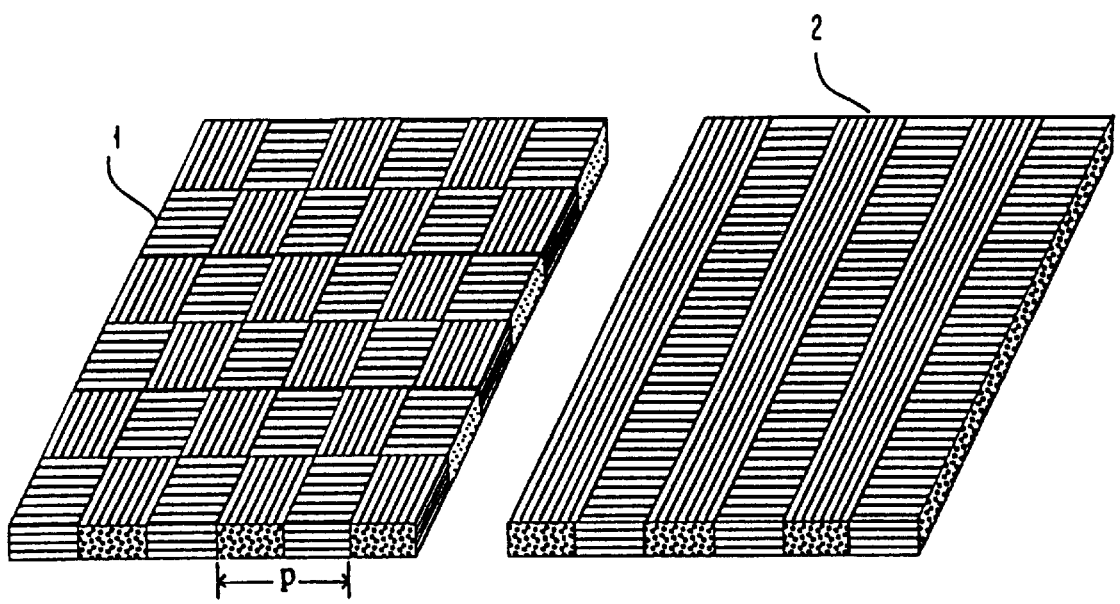
FIG. 1 is an illustration of a micropolarizer array according to the present invention.

Since its invention by E. Land in the 1930's, polyvinyl alcohol (PVA) has been the polarizer material of choice. It is available from several manufacturers including the Polaroid Corporation. It comes as rolls 19 inches wide and thousands of feet long. The PVA, which is 10 to 20 micron thick, is stretched 2 to 5 times original length and treated with iodine to give it its dichroic (polarizing) property. The PVA treated in this manner crystallizes and becomes brittle. The processes below employ certain chemical properties of the PVA. These are: i) resistance to organic solvents and oils; ii) water solubility, 30% water and 70% ethyl alcohol; iii) bleaching of the dichroic effect in hot humid atmosphere and by means of caustic solutions; iv) manifestation of dichroic effect by painting the PVA in iodine/potassium iodide solution; and v) the stabilization of the dichroic effect in boric acid solution. The starting PVA material comes laminated to a clear plastic substrate which protects the brittle PVA and facilitates handling and processing. The substrate is made either of cellulose aceto bytyrate (CAB) or cellulose triacetate (CTA), and is typically 50 to 125 micron thick. CAB and CTA are ultra-clear plastics and at the same time they are good barriers against humidity. For some applications, large glass plates are also used as substrates. Although other polymers, when stretched and treated by dichroic dyes, exhibit similar optical activity to that of PVA and may be fabricated into micropolarizers following the methods taught here, only PVA is considered in the manufacturing processes described in the present invention.

The physical principles on which the polarization of light and other electromagnetic waves, and the optical activity which produces phase retardation (quarter wave and half wave retarders) are described in books on optics, such as: M. Born and E. Wolf, Principles of Optics, Pergamon Press, London, fourth edition, 1970; F. S. Crawford, Jr., Waves, McGraw-Hill, New York, 1968; and M. V. Klein, Optics, Wiley, N. Y., 1970. There are several important facts used in this invention:

1. Two linear polarizers with their optical axis 90 degrees from each other extinguish light.
2. A linear polarization which is 45 degrees from the optical axis of a quarter wave retarder is converted into a circular polarization.
3. A linear polarization which is 45 degrees from the optical axis of a half wave retarder is converted into a linear polarization rotated 90 degrees.
4. Two linear polarization states, P1 and P2, 90 degrees from each other, are converted into clockwise and counter-clockwise circular polarization states by means of a quarter waver retarder.
5. A circular polarization is converted into a linear polarization by means of a linear polarizer.
6. A clockwise circular polarization is converted into a counter-clockwise polarization by means of a half-wave retarder.

Figure 1C:
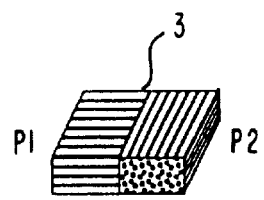
Figure 3A:
FIGS. 2 and 3 illustrate fabrication processes of linear micropolarizers using, respectively, bleaching and selective application of iodine.
Figure 3B:
Figure 3C:
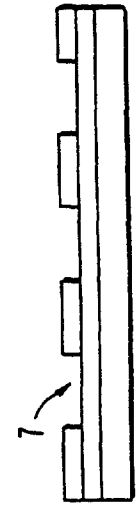
Figure 3D:
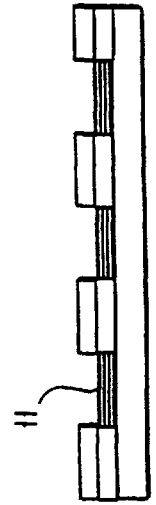
Figure 3E:
Figure 2A:
Figure 2B:
Figure 2C:
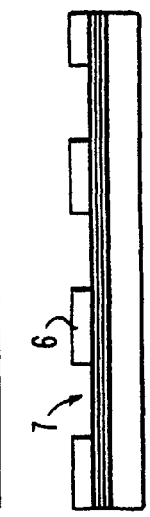
Figure 2D:
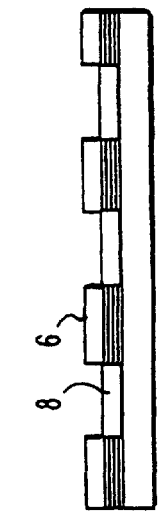
Figure 2E:
Figures 4A, 4B:
FIG. 4 shows final alignment and lamination processes for making linear micropolarizers.
Figure 4C:
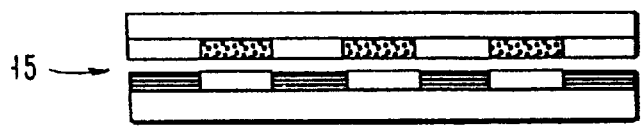
Figure 4D:
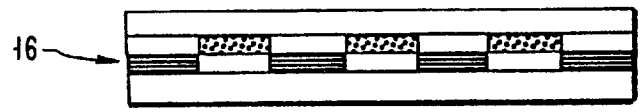
Figure 4E:
Figure 4F:
Figure 4G:
Figure 5A:
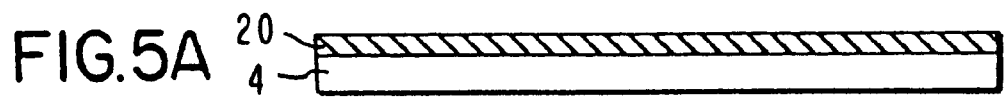
FIG. 5 illustrates a process for fabricating linear micropolarizers by means of etching.
Figure 5B:
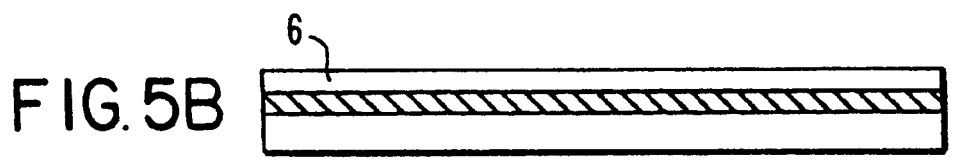
Figure 5C:
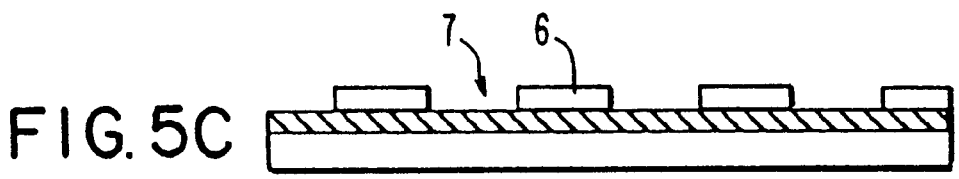
Figure 5D:
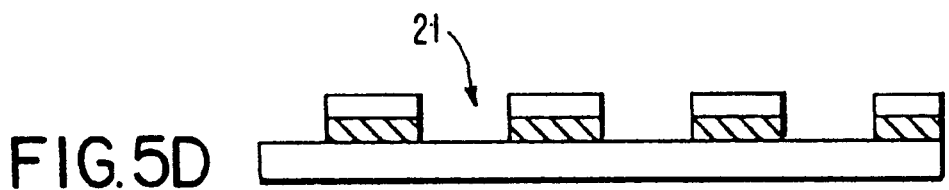
Figure 5E:
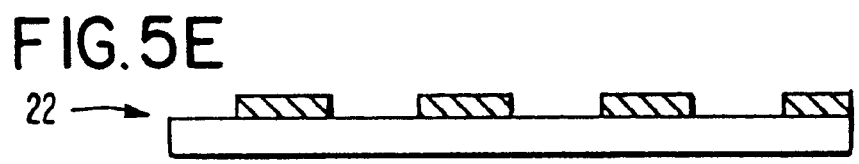
Figure 7A:
FIG. 7 shows final alignment and lamination processes for making linear micropolarizers by the etching method.
Figure 7B:
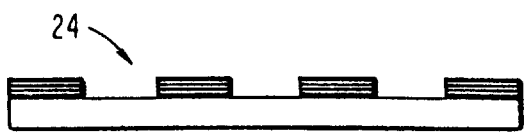
Figure 7C:
Figure 7D:
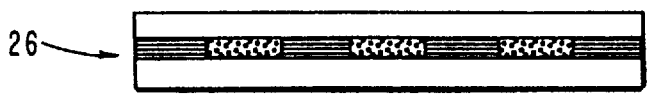
Figure 7E:
Figure 7F:
Figure 7G:
Figures 8A, 8B:
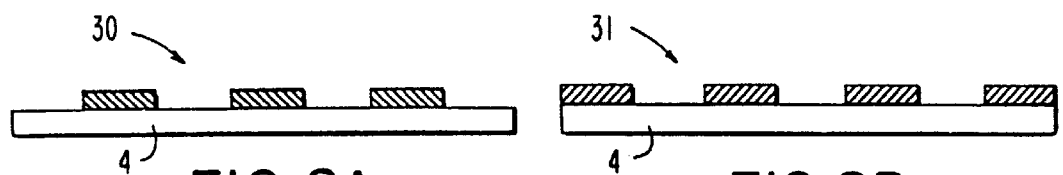
FIG. 8 shows final alignment and lam ion processes for making circular micropolarizers by the etching method.
Figure 8C:
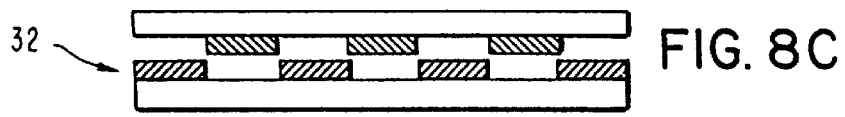
Figure 8D:
Figure 8E:
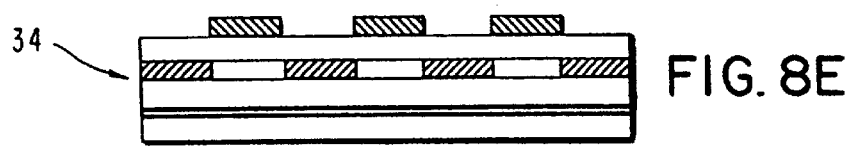
Figure 8F:
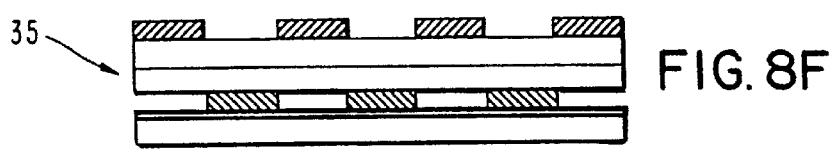
Figure 8G:

The process for producing the micropolarizers, $\mu$Pols, 1, 2 in FIG. 1 is described in FIG. 2 which starts with a sheet of linear polarizer 5 laminated onto a clear substrate 4. The laminate is coated with photosensitive material 6 called photoresist. This can be one of several well known liquid photoresists marketed by Eastman Kodak and Shipley, or in the form of a dry photoresist sheet called Riston from the Du Pont Company. The latter is preferred because complete laminated rolls of the three materials 3, 5, 6 can be produced and used to start the $\mu$Pols process. The photoresist is subsequently exposed and developed using a mask having the desired pattern of the $\mu$Pols cell 3 producing a pattern with polarization parts protected with the photoresist 6 and unprotected parts 7 exposed for further treatment. These exposed parts 7 are treated for several seconds with a caustic solution e.g., a solution of potassium hydroxide. This bleaching solution removes the dichroic effect from the PVA so that the exposed parts 8 are no longer able to polarize light. The photoresist is removed by known strippers, which have no bleaching effect, thus the first part 9 of the $\mu$Pols fabrication is produced. Alternatively, FIG. 3 shows a method for making linear $\mu$Pols by starting with a laminate of PVA 10 which is stretched but does not yet have the dichroic effect, i.e., it has not yet been treated with iodine, and the substrate 4. Following identical steps as above, windows 7 are opened in the photoresist revealing part of the PVA. The next step is to treat the exposed parts with a solution of iodine/potassium iodide and subsequently with a boric acid stabilizing solution. The exposed parts 11 of the PVA become polarizers while those protected with the photoresist remain unpolarizers. Stripping the photoresist completes the first part of the process.

As illustrated in FIG. 4, a complete $\mu$Pol is made using two parts 13, 14 produced by either the process of FIG. 2 or FIG. 3 except that part 13 has polarization axis oriented 90 degrees from that of part 14. The two parts are aligned 15 so that the patterned polarizer areas do not over lap, and then laminated together to from the final product 16. The $\mu$Pol 16 is laminated with the PVA surfaces facing and in contact with each other. The $\mu$Pol 17 is laminated with the PVA of part 13 is in contact with the substrate of part 14. The $\mu$Pol 18 is laminated with the substrates of both parts are in contact with each other. Finally, it is possible to produce the $\mu$Pol 19 with only one substrate onto which two PVA films are laminated and patterned according to the process described above. The above process leaves the patterned PVA film in place and achieves the desired result by either bleaching it or treating it with iodine solution. The processes described in FIGS. 5 and 6 achieve the desired result by the complete removal of parts of the PVA. In FIG. 5, the starting material is any PVA film 20 (linear polarizer, quarter wave retarder, or half wave retarder) or any non-PVA optically active material laminated to a substrate. As described above, windows 7 in the photoresist are opened. The exposed PVA 7 is removed 21 by means of chemical etching (30% water/70% ethyl alcohol solution), photochemical etching, eximer laser etching or reactive ion etching. Stripping the photoresist, the first part 22 of the $\mu$Pols process is completed.

The removal of PVA can also be accomplished by mechanical cutting or milling means. FIG. 6 illustrates the process which uses a diamond cutter 66 mounted on a motor driven shaft 74. In one embodiment, the PVA 68 is sandwiched between two polymers, such as poly-methyl methacrylate, PMMA, film 67, and the sandwich is laminated onto a substrate 69. The diamond saw is used to cut channels. The channel width and the distance between the channels are identical. The PMMA serves to protect the top PVA surface from abrasion and protects the substrate from being cut by the saw. Next the PMMA on top of the PVA and in the channel is dissolved away, leaving the part 71 with clean substrate surface 70. This part can be used as is to complete the $\mu$Pol fabrication or the original substrate 69 is removed by dissolving away the rest of the PMMA, after having attached a second substrate 72. This part which consists of the patterned PVA 68 laminated to the substrate 72 is used in a subsequent step to complete the $\mu$Pol.

Even though this process is mechanical in nature, it has been shown in Electronic Business, May 14, 1990, page 125, that channels and spacings as small as 5 micron can be made using diamond discs manufactured by Disco HI-TEC America Inc., of Santa Clara, Calif. Realizing that using only one disc makes the process slow and costly, the arrangement in FIG. 6 is used where many discs 73 in parallel 75 is preferred. Each disc has its center punched out in the shape of a hexagonal so that it can be mounted on a shaft 74 with a hexagonal cross section. Hundreds of such discs are mounted on the same shaft and are spaced apart by means of spacers 76 whose diameters are smaller than those of the discs. The diameter difference is used to control the cutting depth. The spacers also have hexagonal centers. The cutting discs and the spacers have the same thickness in order to obtain identical channel width and channel spacing. The discs and spacers are mounted on the shaft tightly to prevent lateral motion, while the hexagonal shaft prevents slipping. The discs are made to rotate between 20,000 and 50,000 RPM and the laminate is cut in continuous fashion, thus achieving high through put.

To complete making a whole $\mu$Pol the parts 22, 71, 72 prepared by the PVA removal methods are used as in FIG. 7. If the PVA is a linear polarizer, then, parts 23, 24 have patterned polarizers which are oriented 90 degrees from each other, and when aligned 25, and laminated together, complete linear μPols 26, 27, 28, 29 result. If the PVA is quarter wave retarder, then the parts 30, 31 of FIG. 8 have patterned retarders with optical axes oriented 90 degrees from each other, and when aligned 32 and laminated to a sheet of linear polarizer 33, complete circular μPols 34, 35, 36 result.

Figure 9A:
FIGS. 9 and 10 illustrate processes for making linear and circular polarizers eliminating an alignment step.
Figure 9B:
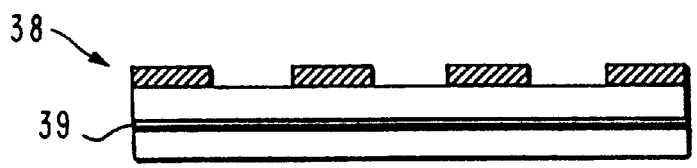
Figure 9C:
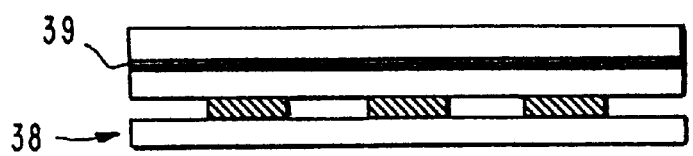
Figure 10A:
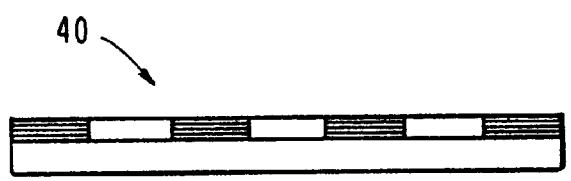
Figure 10B:
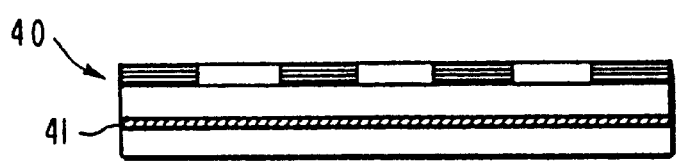
Figure 10C:
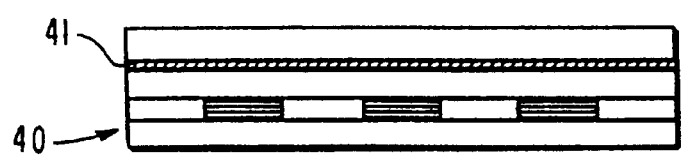

Up until now all μPols have been made using two patterned parts aligned to each other and then laminated as in FIGS. 4, 7, and 8. It possible make μPols with a single patterned part 38 or 40 in FIGS. 9 and 10, and without the alignment step. In FIG. 9, the single patterned part 38 consists of a patterned half-wave retarder on a substrate 4. It is mounted simply on a sheet of polarizer 39 with no alignment necessary and a complete μPols results. If a linear polarizer sheet 39 is used, the result is a linear μPols. If a circular polarizer sheet 39 is used, the result is a circular μPols. In FIG. 10 the single patterned part 40 has a linear polarizer which is simply mounted on a circular polarizer sheet 41 to produce a complete μPols.

Figure 11:
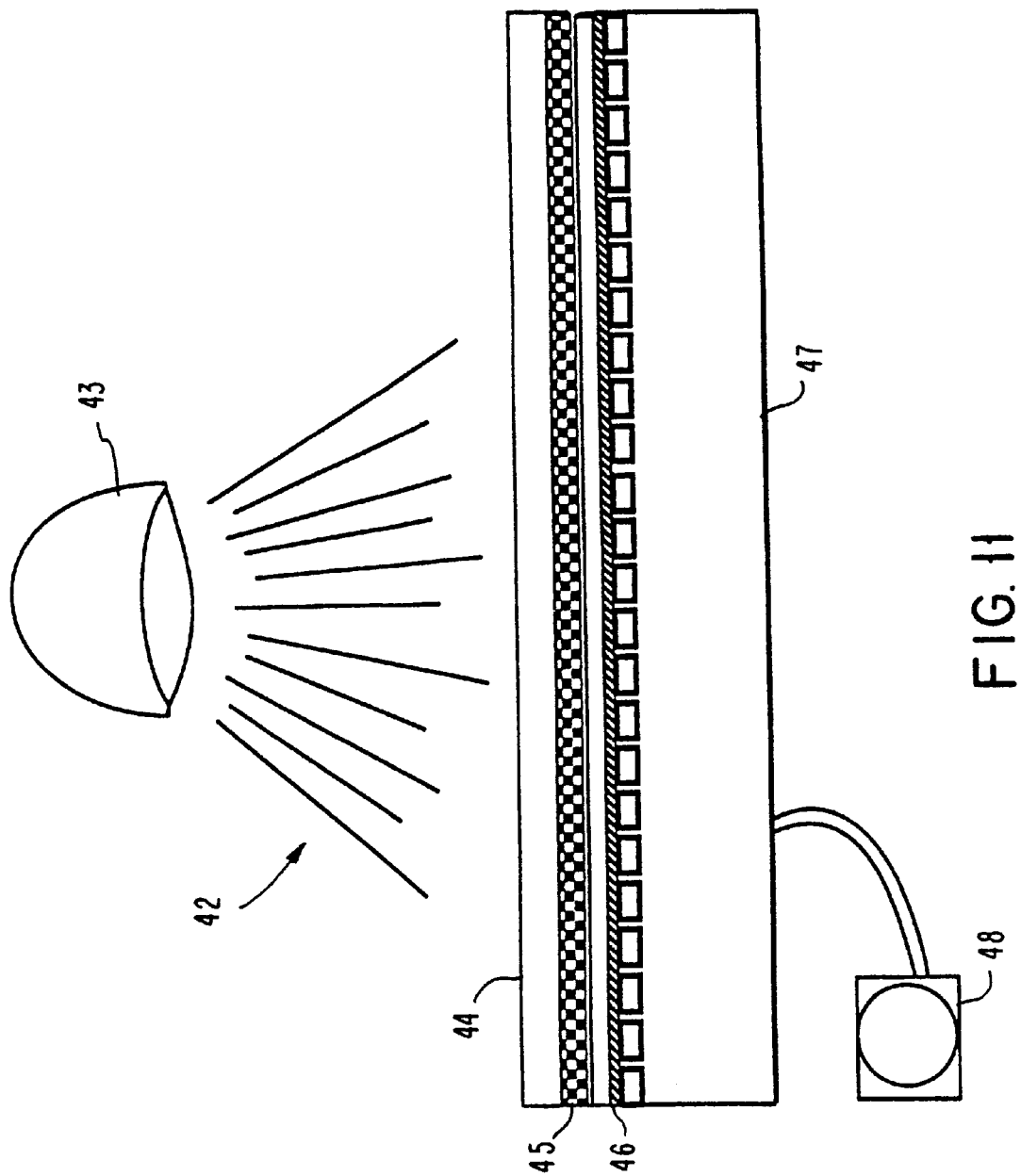
FIGS. 11 and 12 illustrate photo-lithographic patterning steps.
Figure 12:
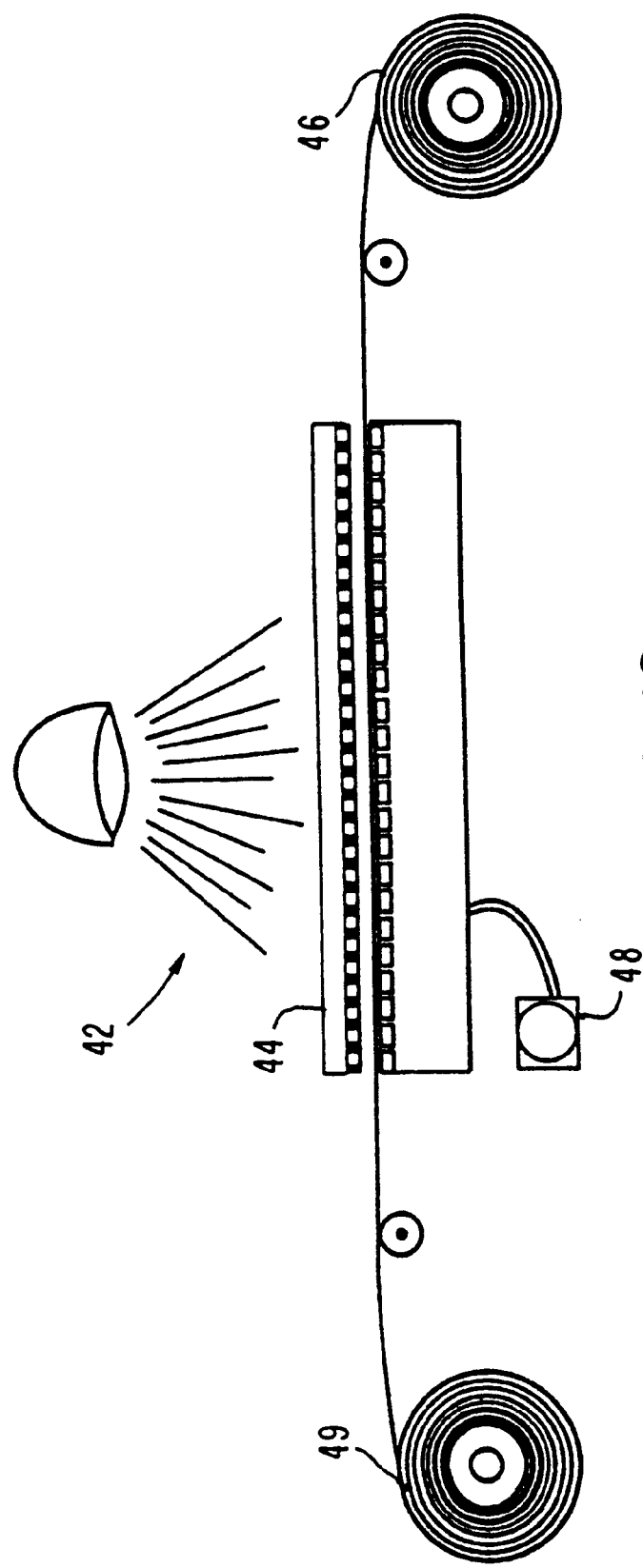

FIG. 11 shows the apparatus 42 used for contact printing of the laminate 46 made of photoresist, PVA, and its substrate. The apparatus consists of a vacuum box 47, and a vacuum pump 48 attached thereto. The top of box is flat surface with vacuum holes which hold the laminate flat during exposure. The mask 45 with its emulsion facing down, makes direct contact with the photoresist surface with the aid of the top glass cover 44. The very high intensity UV lamp 43 is then turned on for 30 to 60 seconds to expose the photoresist. The laminate is subsequently removed for development and the rest of the μPols fabrications processes as described in FIGS. 2, 3, and 5. This printing process using apparatus 46 is automated for large area μPols production as shown in FIG. 12. The laminate 46 is furnished in a large roll, is fed to apparatus 42 when the vacuum pump 48 is off and the mask and cover 44 are open. By means of an electronic controller, the following automatic sequences are carried out: (1) the vacuum is turned on; (2) the cover and mask are lowered; (3) the lamp is turned on for certain period of time; (4) the lamp is turned off; (5) the mask and cover are, lifted; (6) the vacuum is turned off; and (7) the laminate is advanced.

These steps are repeated until the whole roll is finished. The exposed roll 49 is then processed further. This exposure apparatus is simple and has no critical alignment requirements.

The fully automated embodiment in FIG. 13 is used for continuous mass production. The raw roll of laminate 46 enters from the right and the finished roll 56 of μPols exists from the left. As one laminate segment is exposed, it is advanced to the left, developed and rinsed in station 50. Said segment is then further advanced to the left to be dried in station 51, and advanced further to section 52. This station carries out the most critical μPols process by one of three methods discussed above in connection with FIGS. 2, 3, and 5. These are:

1. Bleaching by means of potassium hydroxide then rinsing.
2. Polarizing by means of iodine/potassium iodide solution, boric acid stabilizing solution, then water/methyl alcohol rinse.
3. Dry or wet etching of the PVA.

After the rinsing step in station 52, the segment is advanced to station 53 for drying and heat treatment. The photoresist stripping and rinsing is done in 54 and the final drying step in 55. The finished roll 56 is laminated with a polarizer sheet according to FIGS. 9 and 10 complete the μPols.

The photolithographic printing used above involves several steps:
1. Application of the photoresist
2. Baking
3. Making contact with the mask
4. Exposure
5. Development
6. Rinsing
7. Drying
8. Post baking
9. Stripping
10. Rinsing
11. Drying These steps have been eliminated by using the mechanical method described in FIG. 6. They are also completely eliminated by using the embodiment illustrated in FIG. 14. This apparatus 57 promises to be the least expensive high volume manufacturing process for μPols. It consists of a plate drum 58 to which a plate is fixed, a blanket drum 59 which has a rubber surface, and an impression drum 60. The inks from ink fountains 62, 65, are transferred to the plate by means of rollers 63, 64. The pattern is transferred from the plate to the blanket drum which in turn it transfers to the PVA laminate 61. The rotation of the blanket drum and the impression drums draws in the laminate, and blanket rubber surface pressing on the laminate causes proper printing. Although the hardware is similar to that used in offset printing press, the process is different from offset printing. The principal difference is in the ink formulation. In offset printing slightly acidic water is used in fountain 65, and an oil-based paint (linseed oil, pigments, binder, and other additives) is used in fountain 62. These are not intended to interact w the paper. The pigments in the oil based solution will remain bonded to the paper, and the water evaporates. In the μPols printing process, on the other hand, the oil based solution is clear and is not intended to remain, while the water based solution is intended to interact with the PVA and permanently modify it, by bleaching it or by endowing it with the dichroic property. Another difference is the use of the negative image on the plate to print a positive image of the pattern on the PVA laminate, whereas in the offset printing, the opposite occurs. The plates are made by means which are well known in the offset printing industry.

The μPols process using apparatus 57 has three embodiments which depend on the content of the water based solutions in fountain 65, while fountain 62 contains a fast drying clear oil solution:
1. Selective Bleaching: The water based solution contains a bleaching agent such as potassium hydroxide or sodium hydroxide which applied selectively as pattern on the polarized PVA. Where applied, the solution removes the iodine and its polarizing effect. Rinsing and drying steps follow this bleaching step.
2. Selective Dichroism: The water based solution contains a iodine/potassium iodide which is applied selectively as a pattern on the unpolarized PVA. Where applied, the solution turns the PVA into a polarizer. This step is followed by a stabilizing step using a boric acid solution and subsequently rinsing using a methyl alcohol solution and drying steps.
3. Selective Etching. The water based solution contains a clear polymer which is applied selectively as a pattern on the polarized or unpolarized PVA. Where applied, the solution leaves a protective polymer layer. This step is followed by an etching step to remove the unprotected PVA, by rinsing and drying steps.

Electrically Controllable Micropolarizers

Figure 15:
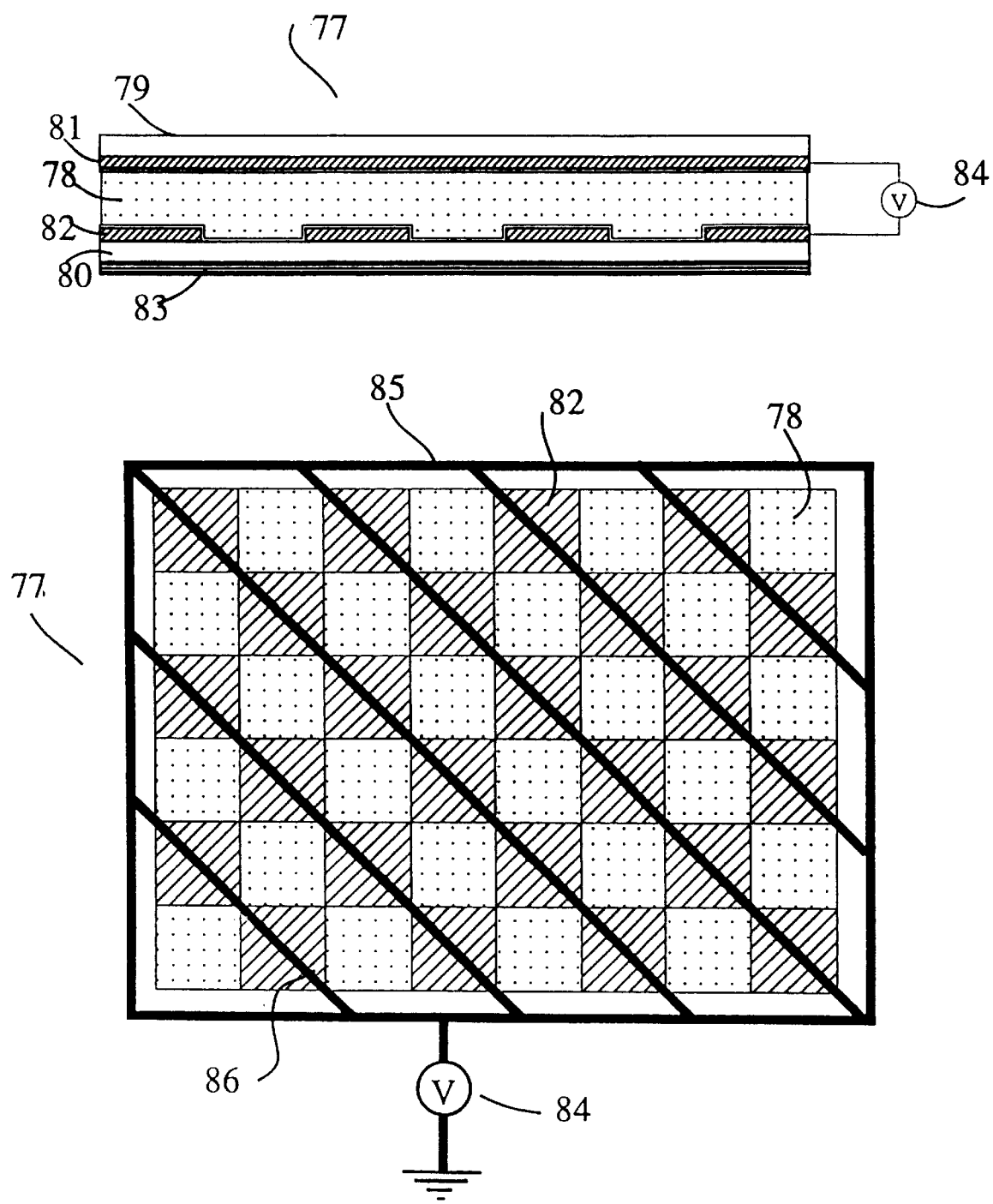
FIG. 15 illustrates an active electronically controllable micropolarizer based on electro-optical effect of liquid crystals.

There are applications in which a variable μPols are needed, and in particular, μPols which are electronically alterable. This can be accomplished by using electro-optical materials such as liquid crystals or organic nonlinear optical polymers, see C. C. Teng and H. T. Man, Applied Physics Letters, 30, 1734 (1990), or magneto-optical materials which have large Faraday rotation. All these materials rotate the polarization of incident radiations by applying voltages or magnetic fields. The preferred embodiment 77 in FIG. 15 uses a twisted nematic liquid crystal 78 which rotates the polarization 90 degrees by applying a voltage alternating at 10 to 20 KHz and having an RMS value of about 10 volts. This voltage is applied between the checker-board patterned transparent electrode made of indium-tin oxide ITO 82 on a glass substrate 80 and an unpatterned ground ITO layer 81 deposited on a second glass substrate 79. The patterned ITO 82 are connected to a common voltage bus 85. Each connection 86 is made of aluminum film whose area is a small percentage of the ITO area, in the order of 10%. Thus we created two types of cells: One type which has liquid crystal and ITO 81, 82 on both sides, will be affected by the applied electric field; and the other type which has liquid crystal but has ITO 81 on one side only and hence will not be affected by the applied electric field. The polarizer sheet 83 with polarization state P1 is laminated to the glass substrate 80 completes the electronic μPols.

The operating principles of electronically switchable μPols is as follows: When the voltage 84 is zero, the polarization P1 of the incident light will not change. When a voltage is applied, the cells with ITO on both sides will rotate the polarization to a state P2, while the cells with ITO on one side only leave the polarization P1 unchanged. The end result is a regular periodic array of cells with two polarization states P1 and P2. This is a μPol that can be turned off and on.

What is claimed is:

1. A system for fabricating a micropolarization panel for use in stereoscopic viewing a 3-D object recorded in a spatially multiplexed image of said 3-D object, said system comprising:
   film providing apparatus for providing a supply of film material characterized by an ability to either phase shift or polarize light passing therethrough;
   film coating apparatus for coating said film material with a protective mask having a predetermined pattern that exposes preselected parts of said film material; and
   film treating apparatus for treating said film material with said protective mask so as to permanently form first and second optically transparent patterns therein, wherein said first optically transparent pattern imparts a first polarization state, P1, to light emanating from pixels through said first optically transparent pattern, and said second optically transparent pattern imparts a second polarization state, P2, to light emanating from pixels through said second optically transparent pattern, and wherein said first optically transparent pattern is a logical inverse of said second optically transparent pattern; and
   film cutting apparatus for cutting said treated film material so as to form a micropolarization panel for use in stereoscopic viewing of a 3-D object recorded in a spatially-multiplexed image of said 3-D object.

2. The system of claim 1, wherein said first and second polarization states are linear polarization states which are oriented 90° from one another.

3. The system of claim 1, wherein said film treating apparatus comprises apparatus for applying a caustic agent to said film coated with said protective mask.

4. The system of claim 1, which further comprises laminating apparatus for applying a lamination layer upon said treated film material.

5. The system of claim 1, wherein said film providing apparatus comprises first and second rotatable drums for supporting and transporting said film material.

6. A method for fabricating a micropolarization panel for use in stereoscopic viewing a 3-D object recorded in a spatially multiplexed image of said 3-D object, said method comprising the steps of:
   (a) providing a sheet of wave retarder film material;
   (b) applying a protective coating to said wave retarder film material; and
   (c) chemically treating said wave retarder film material to selectively remove portions thereof to produce first and second optically transparent patterns in said sheet of wave retarder film material so as to provide a micropolarization panel for use in stereoscopic viewing of a 3-D object recorded in a spatially-multiplexed image of said 3-D object, wherein said first optically transparent pattern imparts a first polarization state P1 to light emanating through said first optically transparent pattern, said second optically transparent pattern imparts a second polarization state P2 to light emanating through said second optically transparent pattern, and said second optically transparent pattern is the logical compliment pattern of said first optically transparent pattern.

7. The method of claim 6, wherein said sheet of wave retarder film is a sheet of half-wave retarder.

8. A system for fabricating a patterned polarizer film, comprising:
   film providing apparatus for providing a film;
   film coating apparatus for coating said film with a protective mask having a predetermined pattern that exposes preselected portions of said film; and
   film treating means for thereafter treating said film to affect the preselected parts of said film to provide a pattern of polarized and unpolarized portions of said film, the polarized parts of the film having a first polarization state, P1.

9. The system of claim 8, wherein said film comprises a polarized film having the first polarization state, P1; and wherein said film treating apparatus comprises polarization state removing apparatus for removing the polarization state of the preselected exposed portions of said film.

10. The system of claim 8, wherein said film comprises a polarized PVA film.

11. The system of claim 8, wherein said film comprises a cholesteric liquid crystal polarizer.

12. The system of claim 8, wherein said film comprises a half-wave retarder.

13. The system of claim 8, wherein said film comprises a quarter-wave retarder.

14. The system of claim 8, wherein said polarization state removing apparatus comprises means for applying an enchant or a solvent solution to the preselected exposed portions of said film.

15. The system of claim 8, which further comprises film laminating apparatus for laminating said film to a sheet of polarizer.

16. The system of claim 15, wherein the film is a retarder, and wherein the sheet of polarizer comprises a sheet of linear polarizer material.

17. The system of claim 8, wherein the film comprises a polarized film having the first polarization state, P1; and wherein said polarization state removing apparatus comprises means for etching away the preselected portions of said film to provide a pattern of polarized portions of said film.

18. A system for fabricating micropolarizing material for use in stereoscopic viewing a 3-D object recorded in a spatially multiplexed image of said 3-D object, said system comprising:

(a) apparatus for providing a film coated with a protective mask having a predetermined pattern that exposes preselected parts of the film; and (b) apparatus for treating said film to affect the preselected parts of said film to provide micropolarization material for use in stereoscopic viewing of a 3-D object recorded in a spatially-multiplexed image of said 3-D object, having a pattern of polarized and unpolarized parts of the film, wherein the polarized parts of said film have a first polarization state, P1.

19. A method of fabricating a micropolarization panel for use in stereoscopic viewing a 3-D object recorded in a spatially multiplexed image of said 3-D object, said system comprising the steps of:

(a) providing a sheet of wave retarder film;

(b) applying a protective coating to said wave retarder film; and (c) for chemically treating said wave retarder film to selectively remove portions thereof to produce first and second optically transparent patterns in said sheet of wave retarder film so as to provide a micropolarization panel for use in stereoscopic viewing of a 3-D object recorded in a spatially-multiplexed image of said 3-D object, whereby said first optically transparent pattern imparts a first polarization state P1 to light emanating through said first optically transparent pattern, said second optically transparent pattern imparts a second polarization state P2 to light emanating through said second optically transparent pattern, and said second optically transparent pattern is the logical compliment pattern of said first optically transparent pattern.

* * * * *